Aug. 20, 1957 W. GRUBER 2,803,283
REPAIR PATCHES FOR RUBBER TIRES AND INNER TUBES
Filed Aug. 24, 1953
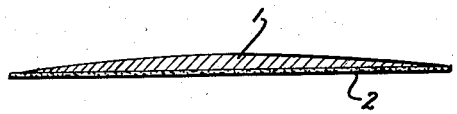
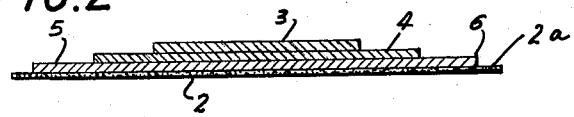
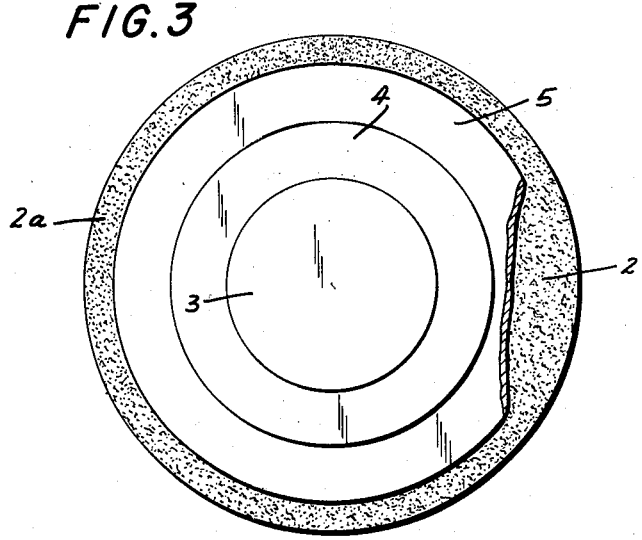
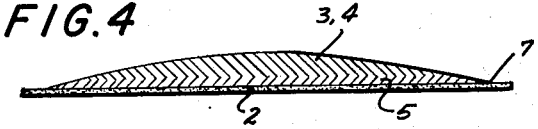
INVENTOR:
Willy Gruber
BY:
Michael S. Striker
agt United States Patent Office 2,803,283
Patented Aug. 20, 1957

2,803,283

REPAIR PATCHES FOR RUBBER TIRES AND INNER TUBES

Willy Gruber, Munich, Germany

Application August 24, 1953, Serial No. 376,197

Claims priority, application Germany February 11, 1953

6 Claims. (Cl. 152—367)

The present invention relates to repair patches for rubber tires and inner tubes.

Repair patches for vulcanized rubber articles, and more particularly but not exclusively for motor vehicle and pedal-cycle tires and tubes, consist essentially of a main body of a certain size which closes and covers the tear, and an adhesive layer of non-vulcanized rubber, which serves to fix the patch to the damaged article. If jointing is to be carried out in known manner by a vulcanization process and is to be capable of completion in the shortest possible time, then the adhesive layer must include sulphur, especially if the article to be repaired is made of a rubber containing very little sulphur.

Under present conditions, however, the main body contains right from the time of its manufacturing process a certain quantity of accelerators, which are absolutely essential in the manufacture of the patch for the shortening of the production time.

Practice has shown that even during the manufacture of the patch and during its storage, the one or more accelerators diffuse from the main body into the adhesive layer and thus initiate in this layer, as a result of the presence of sulphur, a partial vulcanization to a greater or smaller thickness, by reason of which this layer becomes dry and its adhesive power impaired, which produces inadequate adhesion of the patch.

These disadvantages are overcome in a constructional embodiment of the invention, in which the main body of the patch is made wholly or partly from a piece of vulcanized rubber, which contains o-tolylbiguanide in addition to sulphur, so that both in the preparation and during many years storage, the non-vulcanized adhesive layer fixed to the main body remains free from activators and accelerators.

The invention is illustrated by way of example in the accompanying drawings, in which:

Fig. 1 is a section through a patch according to the invention;

Fig. 2 is a patch according to a somewhat different construction, shown by way of example, in a partly fabricated form;

Fig. 3 is a plan view of the embodiment of Fig. 2, shown partly cut away;

Fig. 4 is a section through the embodiment of Figs. 2 and 3 after manufacture has been completed.

In Fig. 1, 1 indicates the vulcanized main body of a patch for the repair of vulcanized rubber articles, for example, motor-vehicle inner tubes and 2 its adhesive layer, which may, for example, have a thickness of from 0.2 to 0.8 mm.

According to the invention, this main body 1 consists of a vulcanized or non-vulcanized piece of rubber, which contains o-tolyl-biguanide, while the non-vulcanized adhesive layer contains sulphur in known manner. Thus both in the preparation of the patch and during many years storage, no diffusion of the accelerator can take place from the main body to the adhesive layer and the adhesive layer therefore remains free of activators and accelerators. By this means a long stability of the patch is ensured, even in hot places such as on board ship and in the tropics. At the same time, the considerable advantage is obtained, that it is now possible to increase appreciably the sulphur content of the adhesive layer without damage, which increase results in an improved joint with the tube, especially if the latter is particularly poor in sulphur content.

The above construction is suitable for patches, which have a comparatively thin main body, that is, equal or even thinner than that according to Fig. 1. For patches with thicker main bodies the following construction is provided according to the invention.

A number of preferably different sized layers 3, 4 of vulcanized or non-vulcanized rubber pieces are provided, which contain rubber soluble accelerators as for example, zinc ethyl-phenyl-dithio-carbamate known under the name "Volkacit P extra N" of the firm Bayer. Obviously other accelerators can be included in these layers, for example, dibutylamine, and activators such as zinc oxide. One or more of the layers 5 next to the adhesive layer, in Figs. 2 and 3, only one layer 5, contain o-tolyl-biguanide. Thus it is possible, in the process of manufacturing the patch, to connect the layers 3 and 4 and to combine them intimately with layer 5 by vulcanization. This can be carried out, for example, by a change of form, in which the shape of the patch is changed from the shape according to Fig. 2 to the shape of Fig. 4. The arrangement of the individual layers according to Fig. 2 can however, also be retained, in that an integral combination is effected only with the contact surfaces without changing the shape of the individual layers.

In Figs. 2 to 4 a particular embodiment of such a patch is chosen, in which the adhesive layer has a larger extent than the adjacent layer 5, as is to be seen at 2a. Thereby, there is obtained a particularly smooth transition from the outer edges 6 or 7 of the layer adjacent the adhesive layer into the vulcanized rubber of the tube, as well as uniformity of tension between the patch and the object to be repaired.

The above described arrangement is effective against the diffusion of the accelerator from the main body to the jointing layer.

Another alternative, in particular, for a multiple layer patch is as follows:

Experience has shown that, in spite of the higher percentage of rubber-soluble accelerators, a diffusion of the same into the unvulcanized jointing layer is practically excluded and the patch therefore has almost unlimited durability if the main body is composed of vulcanized rubber with a higher percentage of rubber-soluble accelerators, for example, 2-mercaptobenzothiazol, known under the name "Merkapto" or zinc ethyl-phenyl-dithio-carbamate, known under the name "P extra N" or the like and of a lower percentage of o-tolyl-biguanide.

As a practical percentage 0.1 to 1.0 percent by weight of o-tolyl-biguanide and 0.5–2.5 percent by weight of rubber-soluble accelerator have proved suitable, both calculated on weight of rubber. Apparently by the proportionately smaller quantity of o-tolyl-biguanide the considerably larger quantity of rubber-soluble accelerator is so influenced that the undesirable diffusion of the accelerators into the jointing layer no longer takes place. On the other hand it is now possible to form the whole main body from a single homogeneous mass, so that the manufacture of such a patch is considerably simplified and cheapened.

The invention is not limited to the accelerators sold under the trade names "Merkapto" or the description "P extra N" of the firm Bayer.

We claim:
1. A patch material for the repair of rubber articles comprising, in combination, a multilayer body comprising an outer adhesive layer of non-vulcanized rubber having sulfur distributed therethrough, said non-vulcanized rubber being adapted to be hardened by said sulfur upon contact of said layer with vulcanization accelerators, and adjacent to said adhesive layer a layer of vulcanized rubber containing between 0.1–1.0% by weight of o-tolyl-biguanide as vulcanization accelerator and between 0.5–2.5% by weight of at least one rubber-soluble vulcanization accelerator, whereby migration of vulcanization accelerators including said rubber-soluble vulcanization accelerator from said vulcanized rubber layer to said adhesive layer is prevented due to the presence in said vulcanized rubber layer of said o-tolyl-biguanide so that said adhesive layer remains unhardened and ready for use even upon prolonged storage of said patch material.

2. A patch material for the repair of rubber articles comprising, in combination, a multilayer body comprising an outer adhesive layer of non-vulcanized rubber having sulfur distributed therethrough, said non-vulcanized rubber being adapted to be hardened by said sulfur upon contact of said layer with vulcanization accelerators, and adjacent to said adhesive layer a layer of vulcanized rubber containing a first amount of o-tolyl-biguanide as vulcanization accelerator and at least one rubber-soluble vulcanization accelerator in an amount greater than said first amount, whereby migration of vulcanization accelerators including said rubber-soluble vulcanization accelerator from said vulcanized rubber layer to said adhesive layer is prevented due to the presence in said vulcanized rubber layer of said o-tolyl-biguanide so that said adhesive layer remains unhardened and ready for use even upon prolonged storage of said patch material.

3. A patch material for the repair of rubber articles comprising, in combination, a multilayer body comprising an outer adhesive layer of non-vulcanized rubber having sulfur distributed therethrough, said non-vulcanized rubber being adapted to be hardened by said sulfur upon contact of said layer with vulcanization accelerators, and adjacent to said adhesive layer a layer of vulcanized rubber containing o-tolyl-biguanide as vulcanization accelerator, whereby migration of vulcanization accelerators from said vulcanized rubber layer to said adhesive layer is prevented due to the presence in said vulcanized rubber layer of said o-tolyl-biguanide so that said adhesive layer remains unhardened and ready for use even upon prolonged storage of said patch material.

4. A patch material for the repair of rubber articles comprising, in combination, a multilayer body comprising an outer adhesive layer of non-vulcanized rubber having sulfur distributed therethrough, said non-vulcanized rubber being adapted to be hardened by said sulfur upon contact of said layer with vulcanization accelerators, and adjacent to said adhesive layer a layer of vulcanized rubber containing o-tolyl-biguanide as vulcanization accelerator and at least one rubber-soluble vulcanization accelerator, whereby migration of vulcanization accelerators including said rubber-soluble vulcanization accelerator from said vulcanized rubber layer to said adhesive layer is prevented due to the presence in said vulcanized rubber layer of said o-tolyl-biguanide so that said adhesive layer remains unhardened and ready for use even upon prolonged storage of said patch material.

5. A patch material for the repair of rubber articles comprising, in combination, a multilayer body comprising an outer adhesive layer of non-vulcanized rubber having sulfur distributed therethrough, said non-vulcanized rubber being adapted to be hardened by said sulfur upon contact of said layer with vulcanization accelerators, a layer of vulcanized rubber adjacent to said adhesive layer and containing o-tolyl-biguanide as vulcanization accelerator, whereby migration of vulcanization accelerators from said vulcanized rubber layer to said adhesive layer is prevented due to the presence in said vulcanized rubber layer of said o-tolyl-biguanide so that said adhesive layer remains unhardened and ready for use even upon prolonged storage of said patch material, and a rubber layer adjacent to said vulcanized rubber layer and containing as vulcanization accelerator only rubber-soluble accelerators.

6. A patch material for the repair of rubber articles comprising, in combination, a multilayer body comprising an outer adhesive layer of non-vulcanized rubber having sulfur distributed therethrough, said non-vulcanized rubber being adapted to be hardened by said sulfur upon contact of said layer with vulcanization accelerators, a layer of vulcanized rubber adjacent to said adhesive layer and containing o-tolyl-biguanide as vulcanization accelerator, whereby migration of vulcanization accelerators from said vulcanized rubber layer to said adhesive layer is prevented due to the presence in said vulcanized rubber layer of said o-tolyl-biguanide so that said adhesive layer remains unhardened and ready for use even upon prolonged storage of said patch material, and a vulcanized rubber layer adjacent to said vulcanized rubber layer and containing as vulcanization accelerator only rubber-soluble accelerators.

References Cited in the file of this patent
UNITED STATES PATENTS

| | | |
|---|---|---|
| Re. 16,682 | Warner | July 19, 1927 |
| 1,478,576 | Morton et al. | Dec. 25, 1923 |
| 1,538,076 | Caldwell | May 19, 1925 |
| 2,358,195 | Wilkinson et al. | Sept. 12, 1944 |
| 2,467,322 | Lightbown et al. | Apr. 12, 1949 |

OTHER REFERENCES

"Modern Rubber Chemistry" (Barron), published by D. Van Nostrand Co., Inc. (New York), 1948 (pp. 203–205 and 213–214).